United States Patent [19]
Peng

[11] Patent Number: 5,458,247
[45] Date of Patent: Oct. 17, 1995

[54] CASSETTE TAPE CONTAINER STORAGE DEVICE

[76] Inventor: Jung-Ching Peng, P.O. Box 82-144, Taipei, Taiwan

[21] Appl. No.: 186,624

[22] Filed: Jan. 26, 1994

Related U.S. Application Data

[63] Continuation-in-part of Ser. No. 182,359, Jan. 18, 1994, Pat. No. 5,370,244.

[51] Int. Cl.⁶ .................................................. A47F 7/00
[52] U.S. Cl. ............................... 211/41; 211/40; 312/9.58
[58] Field of Search .................................. 211/40, 41, 47, 211/48, 81, 96; 312/9.9, 9.58, 9.63, 9.64; 206/309, 387

[56] References Cited

U.S. PATENT DOCUMENTS

| | | | |
|---|---|---|---|
| 1,429,339 | 9/1922 | Green | 312/9.58 |
| 1,439,441 | 12/1922 | Ouellette | 312/9.58 |
| 2,922,527 | 1/1960 | Finn | 211/40 |
| 4,368,934 | 1/1983 | Somers | 312/9.58 X |
| 5,000,526 | 3/1991 | Comerford | 211/40 X |
| 5,099,995 | 3/1992 | Karakane et al. | 312/9.58 X |
| 5,370,244 | 12/1994 | Peng | 211/40 |

*Primary Examiner*—Robert W. Gibson, Jr.
*Attorney, Agent, or Firm*—Alfred Lei

[57] ABSTRACT

A cassette tape container storage device including: a bracket having a left edge and a right edge, a plurality of horizontal arms extending from the right edge and having a tubular portion at an end, and a plurality of tubular members corresponding to the horizontal arms provided at the left edge; a plurality of spring clips each pivotally connected between every two of the tubular members of said bracket, each of said spring clips being formed with an arm at both sides, a front lug, two rear lugs, and a loop portion; and an inverted U-shaped clamping member with two legs each formed at the lower edge with a hook for engaging a lower edge of a cassette tape container and at an intermediate portion with a tubular passage engaged with the corresponding arm of said spring clips.

1 Claim, 4 Drawing Sheets

CASSETTE TAPE CONTAINER STORAGE DEVICE

This application is a continuation-in-part of application Ser. No. 08/182,359, filed Jan. 18, 1994, now U.S. Pat. No. 5,370,244.

BACKGROUND OF THE INVENTION

For many years, it has been the conventional practice to pre-record music, voice, entertainment renditions, and other data on an endless loop of tape such as magnetic which is carried in a cartridge adapted to be inserted into a suitable play-back mechanism, such as a tape recorder. In some instances, data is recorded on a paper tape carried in a cartridge as a unit. The individual tape cartridges are separate units from the recorder or play-back mechanism and when a particular tape is selected, the cartridge carrying the tape is inserted into the tape recorder so that a drive roller engages with an exposed portion of the tape for driving the tape past a use for many years, space requirements for storing tape cartridges are extremely limited and restricted so that orderly storage of many tape cartridges becomes awkward and creates a problem for the owner.

Therefore, it is an object of the present invention to provide an improved cassette tape container storage device which not only stores a quantity of cartridges, but provides a simple and suitable means for forcibly ejecting a selected cartridge from the stored quantity.

SUMMARY OF THE INVENTION

This invention relates to an improved cassette tape container storage device.

It is the primary object of the present invention to provide a cassette tape container storage device which is easy to operate.

It is another object of the present invention to provide a cassette tape container storage device which can prevent the cassette tape container from dropping out.

It is still another object of the present invention to provide a cassette tape container storage device which is simple in construction.

It is still another object of the present invention to provide a cassette tape container storage device which is economic to produce.

It is a further object of the present invention to provide a cassette tape container storage device which can store the cassette tape in a secure but convenient manner.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figures 1, 1A:
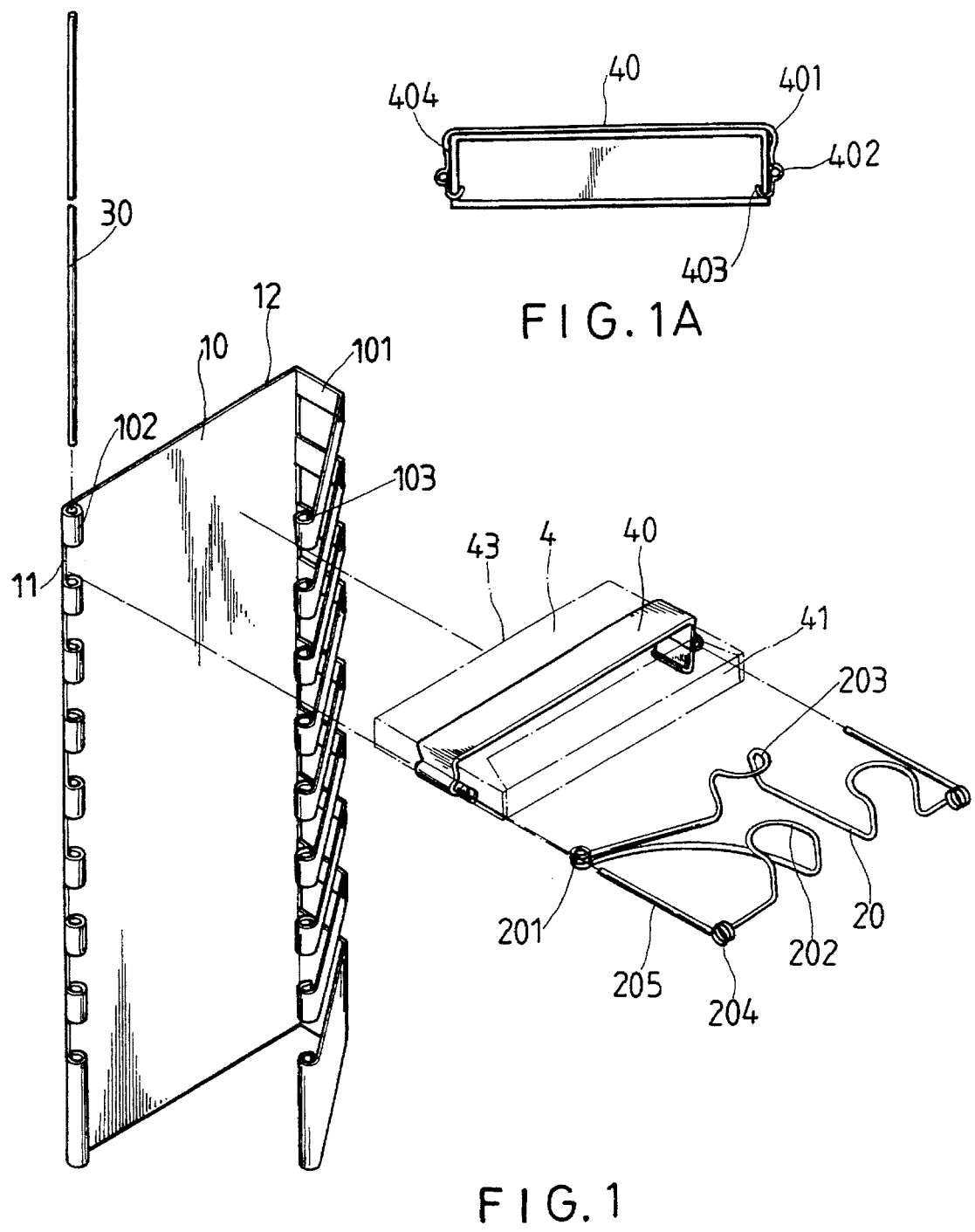
FIG. 1 is an exploded view of the present invention.
FIG. 1A shows the engagement between the cassette tape container and the clamping member.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 5:
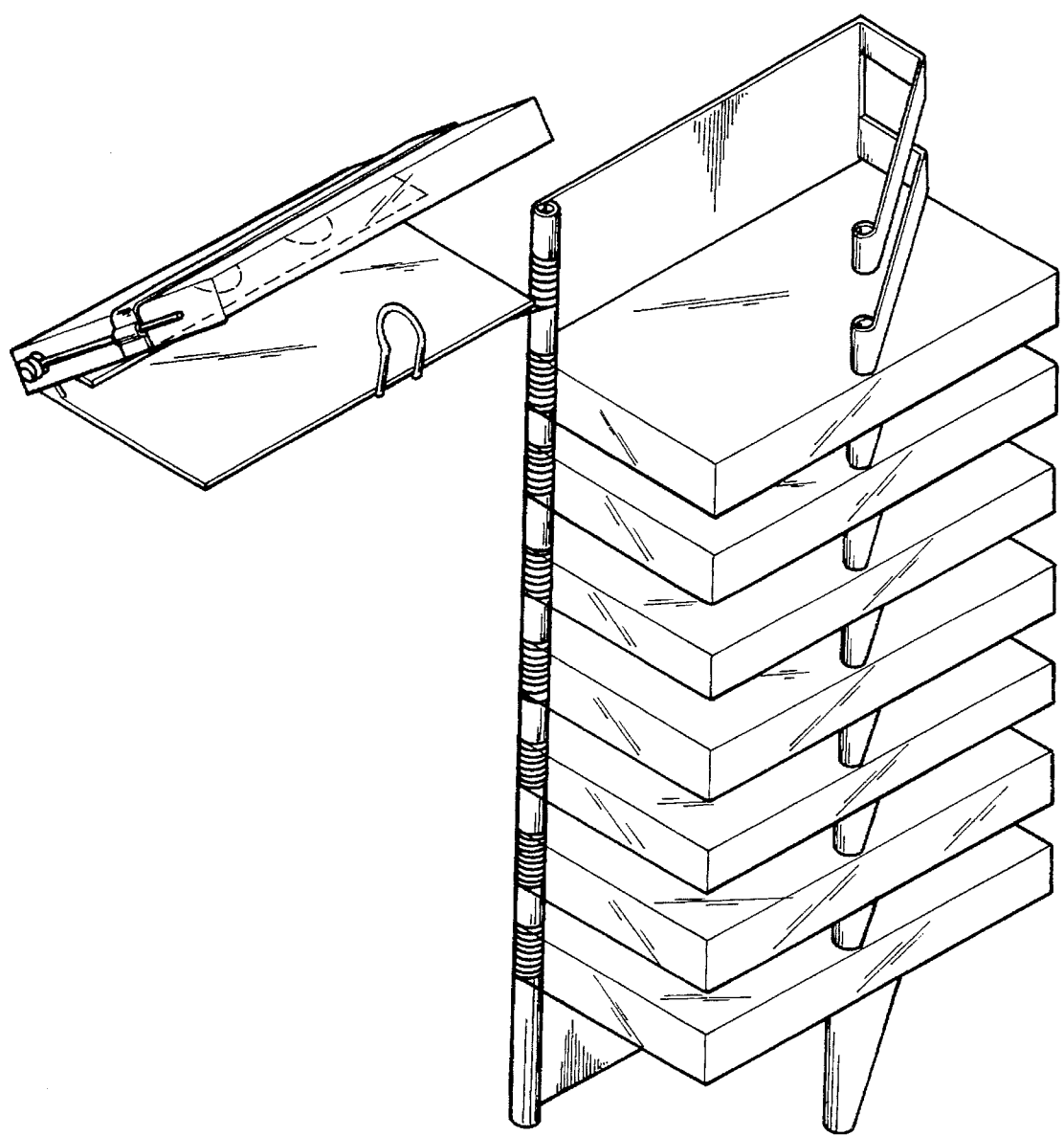
FIG. 5 is a perspective view of the present invention.

With reference to the drawings and in particular to FIG. 1 thereof, the cassette tape container storage device according to the present invention comprises a bracket 10 having a left edge 11 and a right edge 12. A plurality of horizontal arms 101 extend horizontally from the right edge 12 and have a tubular portion 103 at the end. A pluralitiy of tubular members 102 corresponding to the arms 101 are provided at the left edge 11. A spring clip 20 is connected between every two tubular members 102 of the bracket 10. The spring clip 20 is made of a steel wire formed with an arm 205 at both sides, a front lug 203, two rear lugs 202, and a loop portion 201. The loop portion 201 of the spring clip 20 is pivotally connected between every two tubular members 102 of the bracket 10 by a pin 30 extending through the tubular members 102 of the bracket 10 and the loop portions 201 of the spring clips 20 so that the spring clip 20 can be turned out of the bracket 10 (see FIG. 5). An inverted U-shaped clamping member 40 with two legs 404 each having a hook 403 at the lower edge and a tubular passage 402 (see FIG. 1A) is engaged with the spring clip 20, with the tubular passage portions 402 of the clamping member 40 receiving the corresponding arms 205 of the spring clip 20 and the hooks 403 of the clamping member 40 engaged with the lower edge of the cassette tape container 40.

When in use, first insert a cassette tape container 4 into the spring clip 20 in such a way that the spine 41 and the fore-edge 42 of the cassette tape container 40 are engaged with the rear lugs 202 and the front lug 203 of the spring clip 20 respectively and then engage the lower edge of the cassette tape container 40 with the hooks 403 of the clamping member 40.

Figure 2:
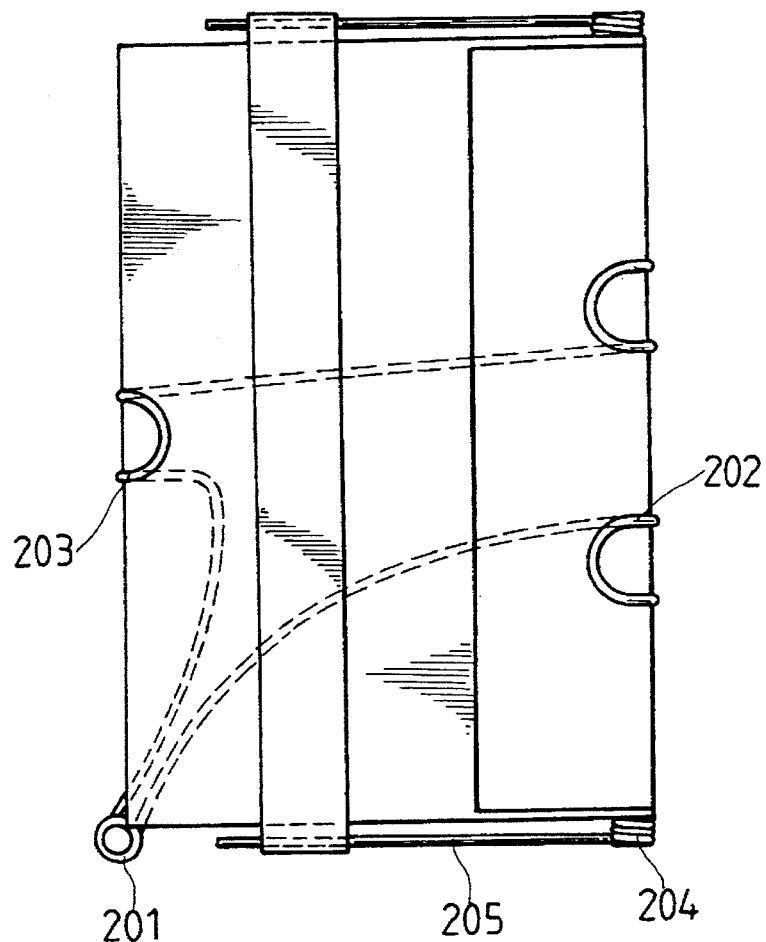
FIG. 2 is a top view of the present invention.
Figure 3:
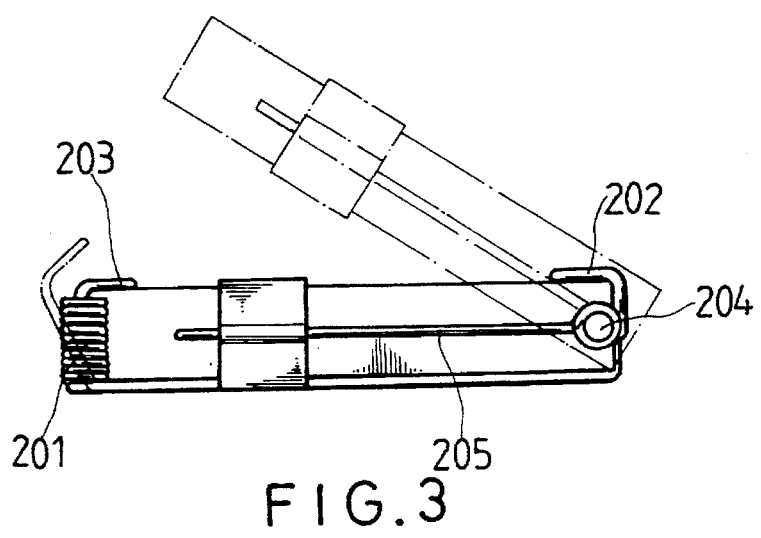
FIG. 3 shows the working principle of the present invention.

When desired to open the cassette tape container 4, simply turn the spring clip 20 together with the cassette tape container 4 out of the bracket 10 and push the front lug 203 outward. As the front lug 203 is pushed outward, the arms 205 will go upward thereby pushing open the cassette tape container 4 (see FIGS. 2, 3 and 5).

Figure 4:
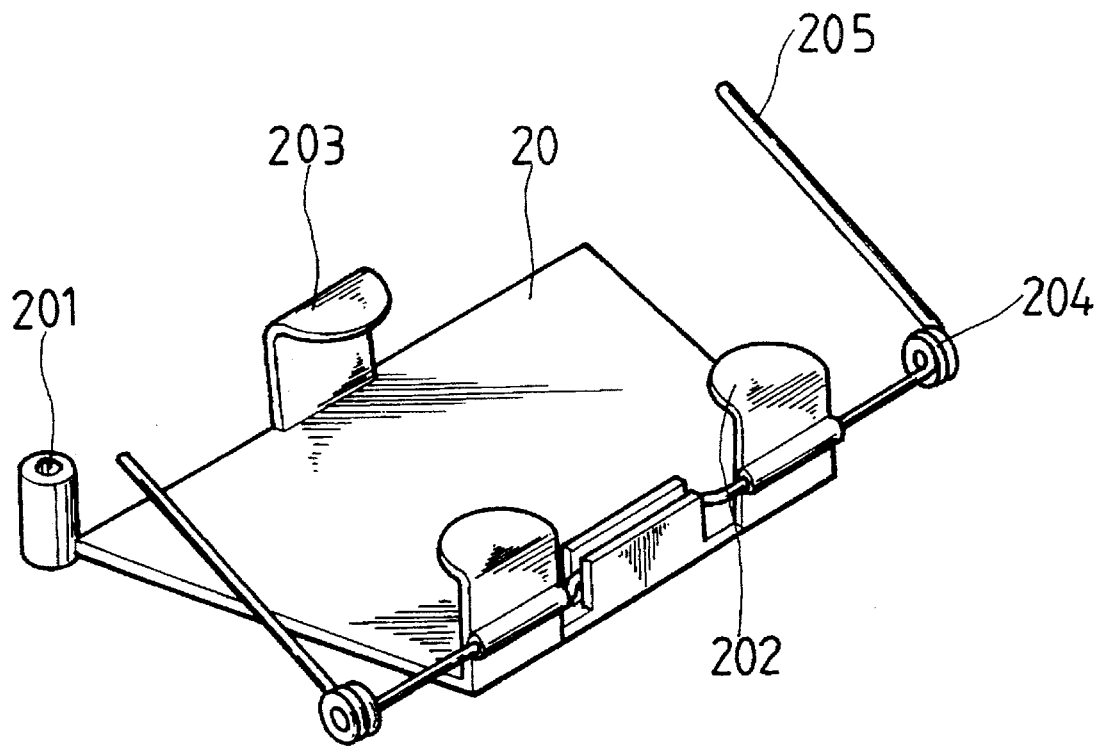
FIG. 4 shows another preferred embodiment of the spring clip.

FIG. 4 shows another preferred embodiment of the spring clip 20, wherein the spring clip 20 includes a plastic body 202 with two rear lugs 202, a front lug 203, and a tubular portion 201 and a spring wire with two arms 205 is mounted on the plastic body 202.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A cassette tape container storage device comprising:

a bracket having a left edge and a right edge, a plurality of horizontal arms extending from the right edge and each arm having a tubular portion at an end, and a plurality of tubular members corresponding to the horizontal arms provided at the left edge;

a plurality of spring clips each pivotally connected between every two of the tubular members of said bracket, each of said spring clips being formed with an arm at both sides thereof, a front lug at a front side, two rear lugs at a rear side, and a loop portion between the front lug and one of the two rear lugs; and an inverted U-shaped clamping member with two legs each leg formed at the lower edge with a hook for engaging a lower edge of a cassette tape container and each leg having intermediate portion with a tubular passage engaged with a corresponding arm of said spring clips.

* * * * *